United States Patent
Khawand et al.

(10) Patent No.: US 8,504,774 B2
(45) Date of Patent: Aug. 6, 2013

(54) DYNAMIC CACHE CONFIGURATION USING SEPARATE READ AND WRITE CACHES

(75) Inventors: Charbel Khawand, Sammamish, WA (US); Scott A. Fudally, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 12/903,834

(22) Filed: Oct. 13, 2010

(65) Prior Publication Data

US 2012/0096225 A1  Apr. 19, 2012

(51) Int. Cl.
 *G06F 13/00* (2006.01)

(52) U.S. Cl.
 USPC .................. 711/119; 711/145; 711/170

(58) Field of Classification Search
 USPC .................. 711/119, 123, 144, 171
 See application file for complete search history.

(56) References Cited

U.S. PATENT DOCUMENTS

| | | | |
|---|---|---|---|
| 4,701,844 A | 10/1987 | Thompson | |
| 5,307,477 A | 4/1994 | Taylor | |
| 5,369,753 A | 11/1994 | Tipley | |
| 5,377,345 A | 12/1994 | Chang | |
| 5,893,150 A * | 4/1999 | Hagersten et al. | 711/139 |
| 6,085,288 A | 7/2000 | Arimilli | |
| 7,451,348 B2 * | 11/2008 | Pecone et al. | 714/14 |
| 7,526,508 B2 * | 4/2009 | Tan et al. | 1/1 |
| 2004/0015731 A1 * | 1/2004 | Chu et al. | 713/300 |
| 2004/0054996 A1 * | 3/2004 | Srinivas et al. | 718/1 |
| 2008/0225622 A1 * | 9/2008 | Hidaka | 365/230.03 |

OTHER PUBLICATIONS

Hu et al., "RAPID-Cache—A Reliable and Inexpensive Write Cache for High-performance Storage Systems," *IEEE Transactions on Parallel and Distributed Systems*, vol. 13, No. 2, 18 pages, Feb. 2002.
"HP Smart Array Controller technology," Technology Brief, 3rd edition, <http://h20000.www2.hp.com/bc/docs/support/SupportManual/c00687518/c00687518.pdf>, 32 pages, Retrieved Date: Jul. 28, 2010.
Oracle, "Oracle Database Concepts 10g Release 2 (10.2), 8 Memory Architecture," <http://docs.oracle.com/cd/B19306_01/server.102/b14220/memory.htm>, 26 pages (Oct. 2005).
Oracle, Understanding Shared Pool Memory Structures, <http://www.oracle.com/technetwork/database/focus-areas/manageability/ps-s003-274003-106-1-fin-v2-128827.pdf>, 24 pages (Sep. 2005).

* cited by examiner

*Primary Examiner* — Reba I Elmore
(74) *Attorney, Agent, or Firm* — Klarquist Sparkman, LLP (57) ABSTRACT

Data from storage devices is stored in a read cache, having a read cache size, and a write cache, having a write cache size. The read cache and the write cache are separate caches. Cache configuration of the read cache and the write cache are automatically and dynamically adjusted based, at least in part, upon cache performance parameters. Cache performance parameters include one or more of preference scores, frequency of read and write operations, read and write performance of a storage device, localization information, and contiguous read and write performance. Dynamic cache configuration includes one or more of adjusting read cache size and/or write cache size and adjusting read cache block size and/or write cache block size.

20 Claims, 7 Drawing Sheets

DYNAMIC CACHE CONFIGURATION USING SEPARATE READ AND WRITE CACHES

BACKGROUND

Devices, such as mobile devices, can suffer from inefficient file system throughput. Such inefficient file system throughput can be caused by a small disk cache as well as the cache locality of read and write activity. Such inefficiencies are magnified in a system that uses a single cache to store data from both read and write operations. For example, using a single cache does not provide the ability to independently configuring the single cache for both read and write operations, which often have different performance requirements.

Therefore, there exists ample opportunity for improvement in technologies related to cache configuration.

SUMMARY

A variety of technologies related to dynamic cache configuration using separate read and write caches are applied.

For example, a computing device comprises a read cache having a read cache size and a separate write cache having a write cache size. The read cache stores data from read requests from a storage device of the computing device, and the write cache stores data from write requests to the storage device of the computing device. The read cache stores data only from read operations from the storage device, and the write cache stores data only from write operations to the storage device. The computing device automatically and dynamically (e.g., without user intervention) adjusts cache configuration of the read cache and the write cache based at least in part upon cache performance parameters measured by the computing device. In some implementations, the automatic and dynamic adjustment comprises adjusting the read and/or write cache size, and/or adjusting the read and/or write cache block size.

In another example, a method for reading and writing data to a storage device comprises reading, by a computing device, data from a read cache having a read cache size, where the read cache stores data from read requests from the storage device of the computing device. The method further comprises writing, by the computing device, data to a write cache having a write cache size, where the write cache stores data from write requests to the storage device of the computing device. The read cache and the write cache are separate caches. The read cache stores data only from read requests and the write cache stores data only from write requests. The method further comprises automatically and dynamically (e.g., without user intervention) adjusting, by the computing device, cache configuration of the read cache and the write cache based at least in part upon cache performance parameters measured by the computing device.

In another example, a computing device comprises a read cache having a read cache size and a separate write cache having a write cache size. The read cache stores data from read requests from a storage device of the computing device and the write cache stores data from write requests to the storage device of the computing device. The read cache stores data only from read operations from the storage device, and the write cache stores data only from write operations to the storage device. The computing device automatically and dynamically (e.g., without user intervention) adjusts cache configuration of the read cache and the write cache based at least in part upon cache performance parameters measured by the computing device, where cache blocks in the read cache have a read cache block size, where cache blocks in the write cache have a write cache block size, and where the computing device sets the read cache block size and the write cache block size independently of each other. The computing device automatically and dynamically adjusts the read cache block size and the write cache block size based, at least in part, on cache performance parameters comprising read performance of the storage device and write performance of the storage device.

In some implementations, the computing device also comprises an application programming interface (API) that is configured for receiving a preference score for one or more data blocks read, or written, by the computing device. The preference score is used, at least in part, by the computing device in determining whether to cache the one or more data blocks and when to evict the one or more data blocks from the read cache or the write cache when the computing device determines to cache the one or more data blocks.

The foregoing and other features and advantages will become more apparent from the following detailed description, which proceeds with reference to the accompanying figures.

DETAILED DESCRIPTION OF EXEMPLARY EMBODIMENTS

The following description is directed to techniques and solutions for providing dynamic cache configuration techniques and solutions using separate read and write caches. The various techniques and solutions can be used in combination or independently. Different embodiments can implement one or more of the described techniques and solutions.

I. EXAMPLE READ CACHE AND WRITE CACHE

In the techniques and solutions described herein, a cache provides intermediate storage of data when reading from, or writing to, a storage device (e.g., a hard disk, flash memory, optical disk, etc.). In the techniques and solutions described herein, the cache is separated into a read cache and a write cache. Separating the cache into independent and distinct read and write caches permits the read and write cache to be configured and/or optimized separately (e.g., independently of each other).

In some implementations, the read cache and the write cache are implemented as separate physical caches (e.g., each cache has its own separate memory component). In other implementations, the read cache and the write cache are stored within the same memory, but are logically separated (e.g., some portion of the memory is used to store read cache data and a different portion of the same memory is used to store write cache data). For example, the read cache and write cache can be stored within dedicated cache memory component of a computing device, or stored within main memory of a computing device.

Regardless of how the read cache and the write cache are separated (e.g., physically or logically), the read cache and the write cache each have an independent cache size. The size of each cache (the read cache size and the write cache size) indicates the size of the cache in terms of data storage capacity. For example, the cache size may be 512 kilobytes (KB) or 1 megabyte (MB). The read cache size and the write cache size can be different sizes. For example, the read cache size could be 1 MB and the write cache size could be 512 KB.

II. EXAMPLE CACHE CONFIGURATION

In the techniques and solutions described herein, cache configuration of the read cache and the write cache can be adjusted. Various parameters can be measured and used to adjust the configuration of the read cache and the write cache.

In a specific implementation, the read cache and/or the write cache are automatically and dynamically adjusted based, at least in part, upon cache performance parameters. The automatic and dynamic adjustment of the cache configuration is performed without user intervention or input (e.g., automatically by a system implementing the cache, such as a computing device).

In a specific implementation, the cache configuration includes the read cache size and/or the write cache size. Adjusting the cache configuration comprises adjusting the read cache size and/or the write cache size. In a situation where the read cache and the write cache share a memory space, the read cache size and the write cache size can be adjusted together. For example, in a computing device with 1 MB of shared cache random-access memory (RAM), the computing device can automatically and dynamically adjust the read cache size and the write cache size by allocating a portion of the 1 MB shared cache RAM to the read cache and the remaining cache RAM to the write cache (e.g., allocating 768 KB to the read cache and allocating 256 KB to the write cache). In a situation where the read cache and the write cache use separate physical memory spaces, the cache sizes can still be adjusted. For example, in a computing device with 1 MB of read cache RAM and 1 MB of write cache RAM, the computing device can automatically and dynamically assign a portion of the read cache memory for use by the write cache and vice-versa (e.g., allocating 256 KB of the write cache RAM for storing read cache data in addition to the 1 MB of read cache RAM, leaving 768 KB of the write cache RAM for write cache data).

In a specific implementation, the cache configuration includes the read cache block size and/or the write cache block size. Adjusting the cache configuration comprises adjusting the read cache block size and/or the write cache block size. Cache block size refers to the size of cache entries (sometimes referred to as cache line size) in the read cache and the write cache. Depending on the situation, different cache block sizes can be used. For example, cache block size can be defined in terms of the number of bytes of data stored in each cache block (e.g., 8 bytes, 512 bytes, 2 KB, 64 KB etc.). The cache block size can also be defined in terms of the storage device block size (e.g., physical block size) from which the cache contents are read from or written to. For example, if a storage device (e.g., hard disk or flash memory) stores data in 512 byte blocks (the storage device block size), then the cache block size can be set to match (e.g., 512 byte cache block size), or the cache block size can be set to a multiple (e.g., 2 KB cache block size, which stores 4 storage device blocks). The read cache block size and the write cache block size can be set to the same block size or to different block sizes (e.g., the read cache block size may be set to 4 KB while the write cache block size may be set to 2 KB).

III. EXAMPLE CACHE PERFORMANCE PARAMETERS

In the techniques and solutions described herein, cache configuration of the read cache and the write cache can be adjusted based, at least in part, on cache performance parameters. Cache performance parameters refer to performance parameters of the read and/or write cache as well as associated storage devices. Examples of cache performance parameters include preference scores, frequency of read and/or write requests, read and/or write storage device performance, read and/or write localization, and read and/or write contiguous performance.

In a specific implementation, cache performance parameters are measured by a computing device operating the read and write cache. For example, a processing unit of the computing device can monitor performance parameters of the read and write cache along with performance parameters of associated storage devices. Performance parameters can also be measured by a specific component of the computing device, such as a storage device performance monitor component, or received from other components of the computing device, such as a file system component.

IV. EXAMPLE AUTOMATICALLY AND DYNAMICALLY ADJUSTING CACHE CONFIGURATION

In the techniques and solutions described herein, cache configuration can be automatically and dynamically adjusted. In a specific implementation, cache configuration is automatically and dynamically adjusted based, at least in part, upon cache performance parameters (e.g., as measured by a computing device comprising the read cache and the write cache).

In a specific implementation, a computing device provides an application programming interface (API) for sending and/or receiving cache performance parameters. For example, the cache performance parameters can be received from a component or module (e.g., a hardware and/or software component or module) of a computing device, such as from a file system component. In the specific implementation, the cache performance parameters received via the API include preference scores (e.g., integer values) received from the file system component. The preference scores are used to indicate whether a storage device block (or a collection of storage device blocks) should be stored in the cache, or passed through the cache.

Providing the API allows better and more efficient use of the available read cache and write cache memory and improves the eviction and replacement cache strategy. For example, the computing device can use the preference scores to replace lower value blocks in the read cache with higher value blocks (e.g., by comparing the preference scores of each). As another example, the file system can give a higher preference score to blocks (or collections of blocks) containing the root directory of the file system. As yet another example, the file system can give a lower preference score to large writes and/or reads that the file system predicts (e.g., based on read and/or write patterns monitored by the file system) are unlikely to be needed in the near future. The file system can also use the preference scores to decide when to evict a block (or group of blocks) from the cache (e.g., by evicting blocks, or groups of blocks, with the lowest preference score first). Preference scores can be used alone or in combination with other cache performance parameters in determining when to store storage device blocks in the cache and when to replace or evict stored blocks from the cache.

In some implementations, the read cache size and/or the write cache size are automatically and dynamically adjusted based, at least in part, upon cache performance parameters. In one implementation, the amount of memory assigned to store read cache data and/or the amount of memory assigned to store write cache data is adjusted based on a frequency of read requests and a frequency of write requests. For example, if the frequency of read requests compared to the frequency of write requests is greater than a threshold, the read cache size can be increased (e.g., a 1 MB read cache size and a 1 MB write cache size can be adjusted to 1.25 MB read cache size and 0.75 MB write cache size).

In some implementations, the read cache block size and/or the write cache block size are automatically and dynamically adjusted based, at least in part, upon cache performance parameters. The read cache block size and the write cache block size can be adjusted independently (i.e., the read cache block size can be a different block size from the write cache block size). In one implementation, a computing device measures the storage device read and/or write performance, including how long it takes for write and/or read operations to complete to/from the storage device. For example, if the storage device responds quickly to read requests (read requests complete quickly), but slowly to write requests (write request complete slowly), then the write cache block size can be decreased (because smaller sized write cache blocks will complete quicker) and/or the read cache block size can be increased (this could increase cache performance while still maintaining quick read request completion). In this situation, it is also likely that more write requests will be pending in the cache at any given time than read requests, and therefore the write cache size could be increased and/or the read cache size could be decreased.

In another implementation, localization information (e.g., a history of localization information for read and/or write operations) is measured (e.g., by a computing device) as a cache performance parameter used in determining read cache block size and/or write cache block size. Localization refers to whether blocks being read or written are near each other on the storage device. Blocks on a storage device that are highly localized can be read from, or written to, more quickly than blocks that are not localized (e.g., fragmented). If read localization increases, then the read cache block size is increased in order to store a greater number of nearby storage device blocks in each read cache block. On the other hand, if read localization decreases, then the read cache block size is decreased so that read requests store fewer nearby storage device blocks in each read cache block, and thus increasing read block diversity in the read cache. The write cache is adjusted in the same manner.

In another implementation, contiguous read and/or write performance of a storage device is measured as a cache performance parameter used in determining read cache block size and/or write cache block size. Contiguous performance refers to the amount of time it takes the storage device to read or write a number of contiguous storage device blocks. The contiguous read and/or write performance can be used in determining read cache block size and/or write cache block size. For example, if a computing device is sequentially writing out a large file (e.g., a large video file), then the write cache block size can be increased. However, decreased performance can result if the write cache block size is increased too far (e.g., at the cost of block diversity in the cache). Therefore, the contiguous performance measurement can be used to set an upper limit on the write cache block size. For example, if the contiguous performance of write operations increases from one to 16 storage device blocks, and then levels off so that the contiguous performance of writing 32 storage device blocks and above is the same (or less) than writing 16 storage device blocks, then the upper limit for the write cache block size can be set to 16. Similar measurements can be performed for the read cache and an upper limit for the read cache block size can be determined.

In different implementations, the cache size and/or the cache block size of the read and/or write cache can be adjusted (e.g., independently adjusted) based on one or more of the techniques described in this section. The techniques can be applied in combination or independently.

V. EXAMPLE COMPUTING DEVICES COMPRISING SEPARATE READ AND WRITE CACHES

Figure 1:
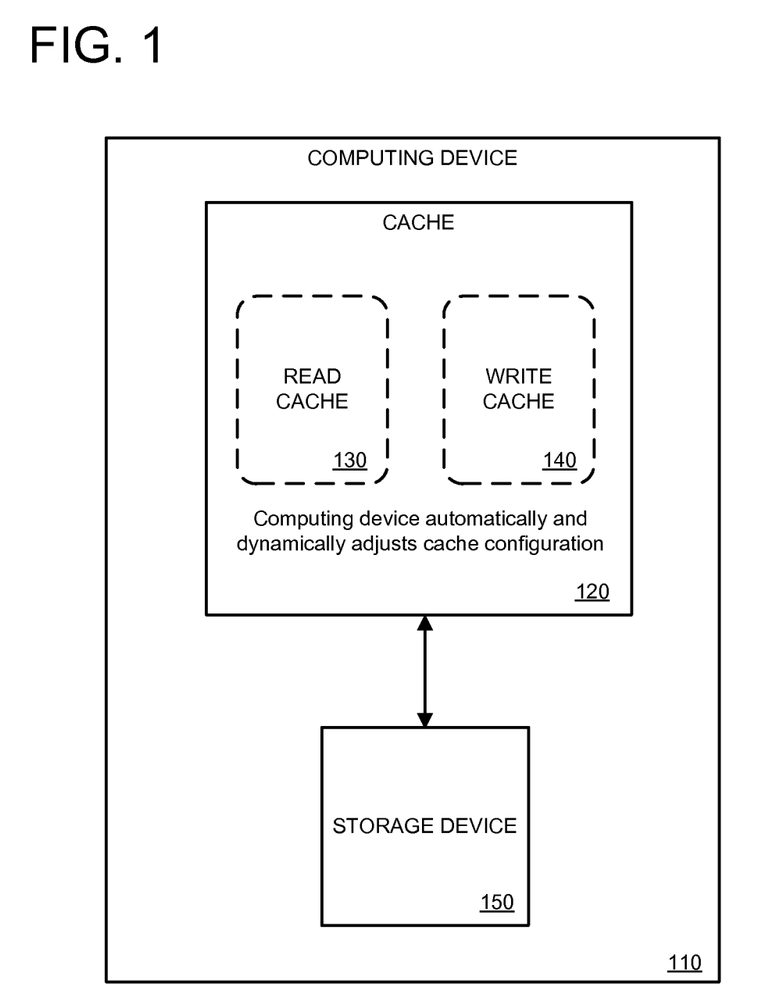
FIG. 1 is a block diagram showing an example computing device that uses separate read and write caches.

FIG. 1 depicts an example computing device 110 comprising separate read and write caches. The computing device 110 can be any type of computing device, such as a mobile computing device (e.g., a smart phone, mobile phone, tablet computer, netbook, etc.), or another type of computing device, such as a desktop computer, laptop computer, notebook computer, media player, digital camera or camcorder, etc.

The computing device 110 comprises a cache 120 with a separate read cache 130 and write cache 140. The read cache 130 has a read cache size (e.g., 1 MB, 2 MB, etc.), and the write cache 140 has a write cache size. The read cache size and write cache size can be the same size, or they can be different sizes. In some implementations, the read cache 130 and write cache 140 share a cache memory space (e.g., RAM). For example, an amount of cache RAM (e.g., 4 MB) can be divided between the read cache (e.g., allocated 3 MB of the total cache RAM) and the write cache (e.g., allocated 1 MB of the total cache RAM). In other implementations, the read cache 130 and write cache 140 have separate physical cache memories.

The read cache 130 stores data from read requests from one or more storage devices of the computing device 110, such as from storage device 150. The write cache 140 stores data from write requests to one or more storage devices of the computing device 110, such as to storage device 150. The read cache 130 stores data only from read operations, and the write cache 140 stores data only from write operations.

The computing device 110 automatically and dynamically (e.g., without any user intervention or input) adjusts the cache configuration of the read cache 130 and the write cache 140 based, at least in part, upon cache performance parameters. The computing device 110 can adjust cache configuration independently for each of the read cache 130 and the write cache 140. The cache performance parameters are measured by the computing device 110 (e.g., by various components or modules of the computing device 110).

In some implementations, the computing device 110 automatically and dynamically adjusts the read cache size of the read cache 130 and the write cache size of the write cache 140. For example, the read cache size and write cache size can be adjusted based on cache performance parameters comprising preference scores for cache blocks read and/or written (e.g., via an API), the frequency of read requests and the frequency of write requests, the read and write performance of the storage device 150, localization information, and/or contiguous read and write performance.

In some implementations, the computing device 110 automatically and dynamically adjusts the read cache block size of the read cache 130 and the write cache block size of the write cache 140. For example, the read cache block size and write cache block size can be adjusted based on cache performance parameters comprising the frequency of read requests and the frequency of write requests, the read and write performance of the storage device 150, localization information, and/or contiguous read and write performance.

Figure 2:
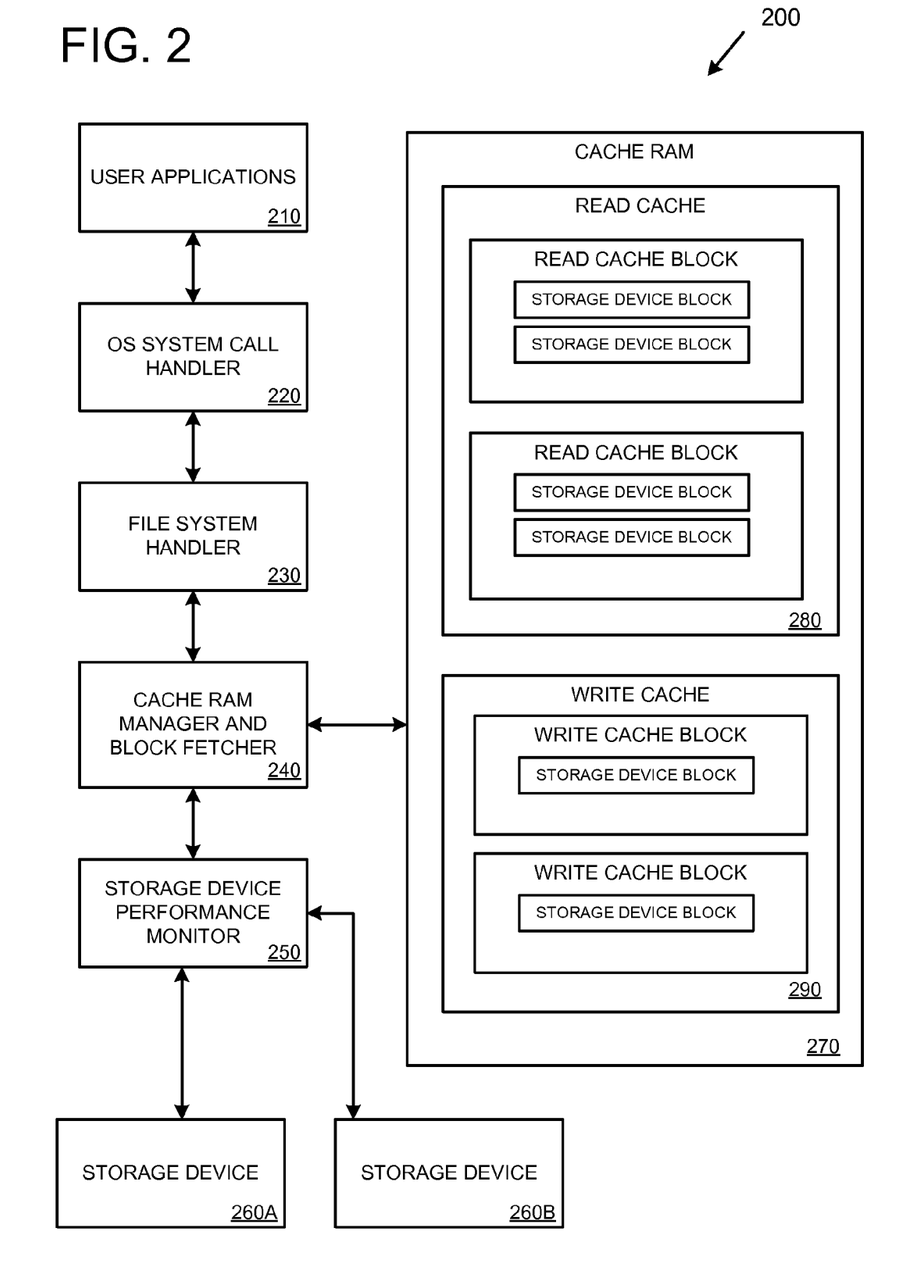
FIG. 2 is a block diagram showing example components of a computing device that uses separate read and write caches.

FIG. 2 depicts example components of a computing device 200 that uses separate read and write caches. The computing device 200 includes various components and/or modules for performing computing functions, including user applications 210, an operating system—system call handler 220, a file system handler 230, a cache ram manager and block fetcher 240, and a storage device performance monitor 250.

The computing device 200 comprises cache ram 270 that has memory space allocated to a read cache 280 and a write cache 290. The read cache 280 and write cache 290 are separate caches, with the read cache 280 storing only data from read operations involving storage devices and the write cache 290 storing data only for write operations involving storage devices.

The computing device 200 automatically and dynamically adjusts cache configuration (e.g., cache size for each of the read cache 280 and write cache 290, as well as cache block size for each of the read cache 280 and write cache 290) based on cache performance parameters. For example, the cache performance parameters can be measured, at least in part, via the storage device performance monitor 250.

As depicted in the example read cache 280, the read cache is storing two read cache blocks. Each of the two read cache blocks is storing two storage device blocks. Therefore, the read cache block size, as depicted in 280, is equal to two storage device blocks (e.g., two physical blocks of storage device 260A or 260B).

As depicted in the example write cache 290, the write cache is storing two write cache blocks. Each of the two write cache blocks is storing one storage device block. Therefore, the write cache block size, as depicted at 290, is equal to one storage device block (e.g., one physical block of storage device 260A or 260B).

In some implementations, the computing device 200 automatically and dynamically adjusts the read cache size of the read cache 280 and the write cache size of the write cache 290. For example, the read cache size and write cache size can be adjusted based on cache performance parameters comprising preference scores for cache blocks read and/or written (e.g., via an API), the frequency of read requests and the frequency of write requests, the read and write performance of the storage device(s) 260A-B, localization information, and/or contiguous read and write performance.

In some implementations, the computing device 200 automatically and dynamically adjusts the read cache block size of the read cache 280 and the write cache block size of the write cache 290. For example, the read cache block size and write cache block size can be adjusted based on cache performance parameters comprising the frequency of read requests and the frequency of write requests, the read and write performance of the storage device(s) 260A-B, localization information, and/or contiguous read and write performance.

VI. EXAMPLE METHODS FOR DYNAMIC CACHE CONFIGURATION USING SEPARATE READ AND WRITE CACHES

Figure 3:
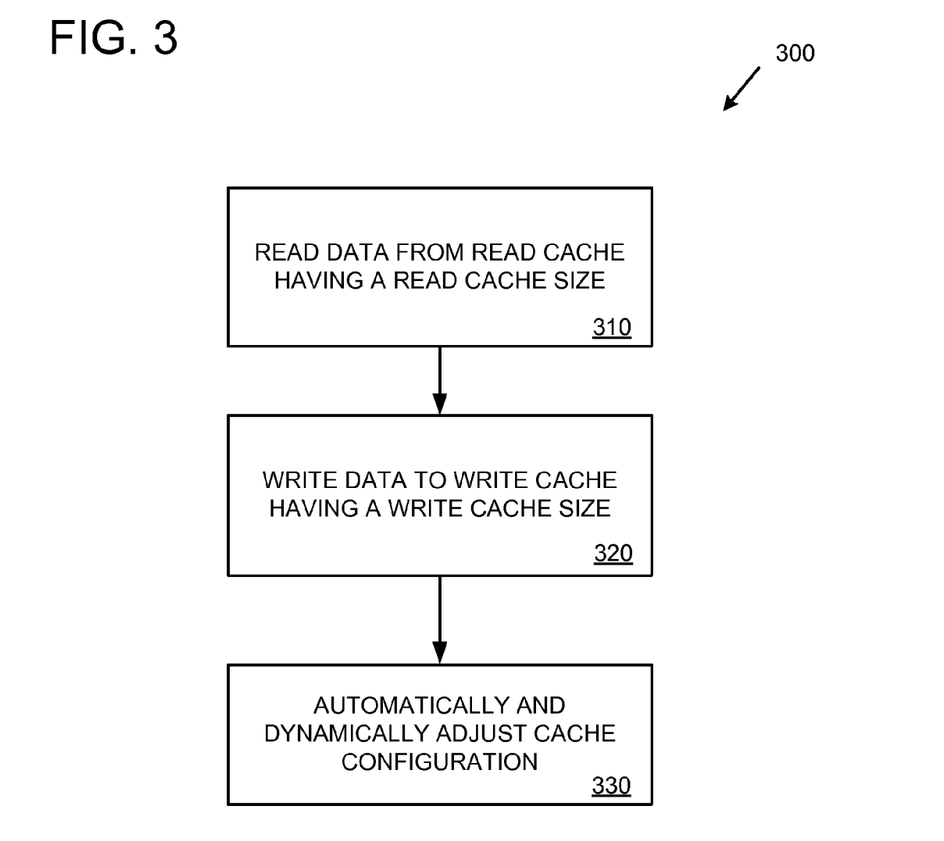
FIG. 3 is a flowchart showing an example method for dynamic cache configuration using separate read and write caches.

FIG. 3 shows an example method 300 for dynamic cache configuration using separate read and write caches. The method can be implemented, for example, using the computing device depicted in FIG. 1 or the computing device depicted in FIG. 2.

At 310, data is read from a read cache having a read cache size. The read cache stores data only from read requests from a storage device. At 320, data is written to a write cache having a write cache size. The write cache stores data only from write requests to the storage device. The read cache and write cache are separate caches.

At 330, the cache configuration of the read cache and write cache are automatically and dynamically adjusted based, at least in part, upon cache performance parameters. For example, the cache configuration is automatically and dynamically adjusted 330 by a computing device based on cache performance parameters measured by the computing device.

In a specific implementation, the cache configuration is automatically and dynamically adjusted 330 by adjusting the read cache size and/or cache block size, and/or by adjusting the write cache size and/or the write cache block size. For example, the read cache size and write cache size can be adjusted based on cache performance parameters comprising preference scores for cache blocks read and/or written (e.g., via an API), the frequency of read requests and the frequency of write requests, the read and write performance of the storage device, localization information, and/or contiguous read and write performance. The read cache block size and write cache block size can be adjusted based on cache performance parameters comprising the frequency of read requests and the frequency of write requests, the read and write performance of the storage device, localization information, and/or contiguous read and write performance.

Figure 4:
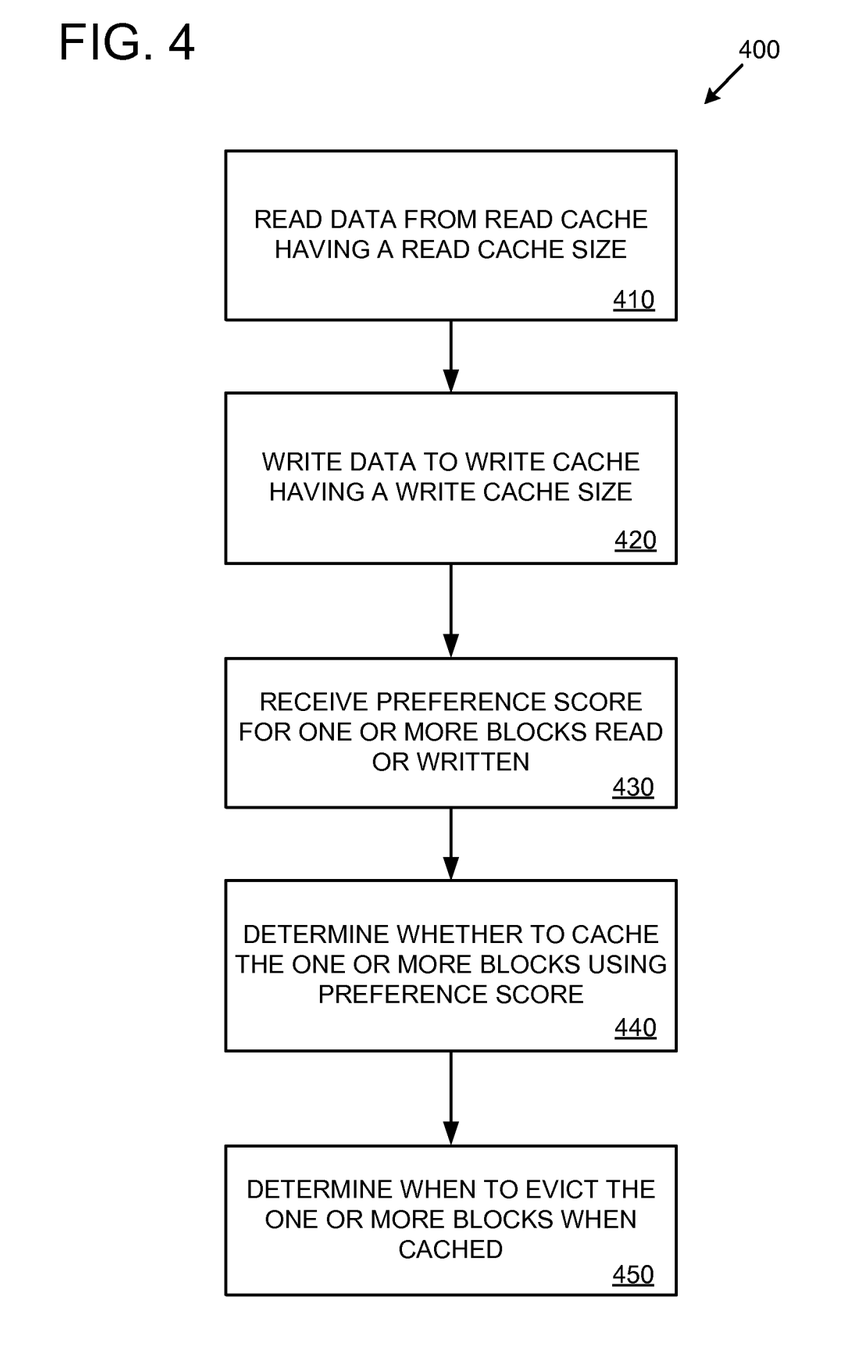
FIG. 4 is a flowchart showing an example method for dynamic cache configuration of separate read and write caches using preference scores.

FIG. 4 shows an example method 400 for dynamic cache configuration of separate read and write caches using preference scores. The method can be implemented, for example, using the computing device depicted in FIG. 1 or the computing device depicted in FIG. 2.

At 410, data is read from a read cache having a read cache size. The read cache stores data only from read requests from a storage device. At 420, data is written to a write cache having a write cache size. The write cache stores data only from write requests to the storage device. The read cache and write cache are separate caches.

At 430, preference scores are received for one or data blocks read or written from a storage device. A separate preference score can be associated with each read block and write block, or a preference score can be assigned to groups of read blocks or groups of write blocks. In a specific implementation, the preference scores are received from a file system via an API.

At 440, a determination is made whether to cache the one or more read or write blocks. The determination is made 440 based, at least in part, on the preference scores. For example, a computing device reading a block (a read block comprising one or more storage device blocks) from a storage device can receive a preference score (e.g., from the file system associated with the storage device) for the read block. The computing device can then use the preference score in determine whether to store (cache) the read block in the cache. If the decision is not to store the read block, then the data block is "passed through" (i.e., not stored in the read cache).

At 450, when the one or more blocks are stored in the cache and not passed through, a determination is made when to evict the one or more stored blocks. For example, a computing device that has stored one or more blocks, read from a storage device, in the read cache, needs to decide when to remove or replace the one or more blocks stored in the cache. The one or more blocks can be evicted from the read cache based on their preference score (e.g., blocks in the read cache with lower preference scores will be evicted before blocks in the read cache with higher preference scores).

Figure 5:
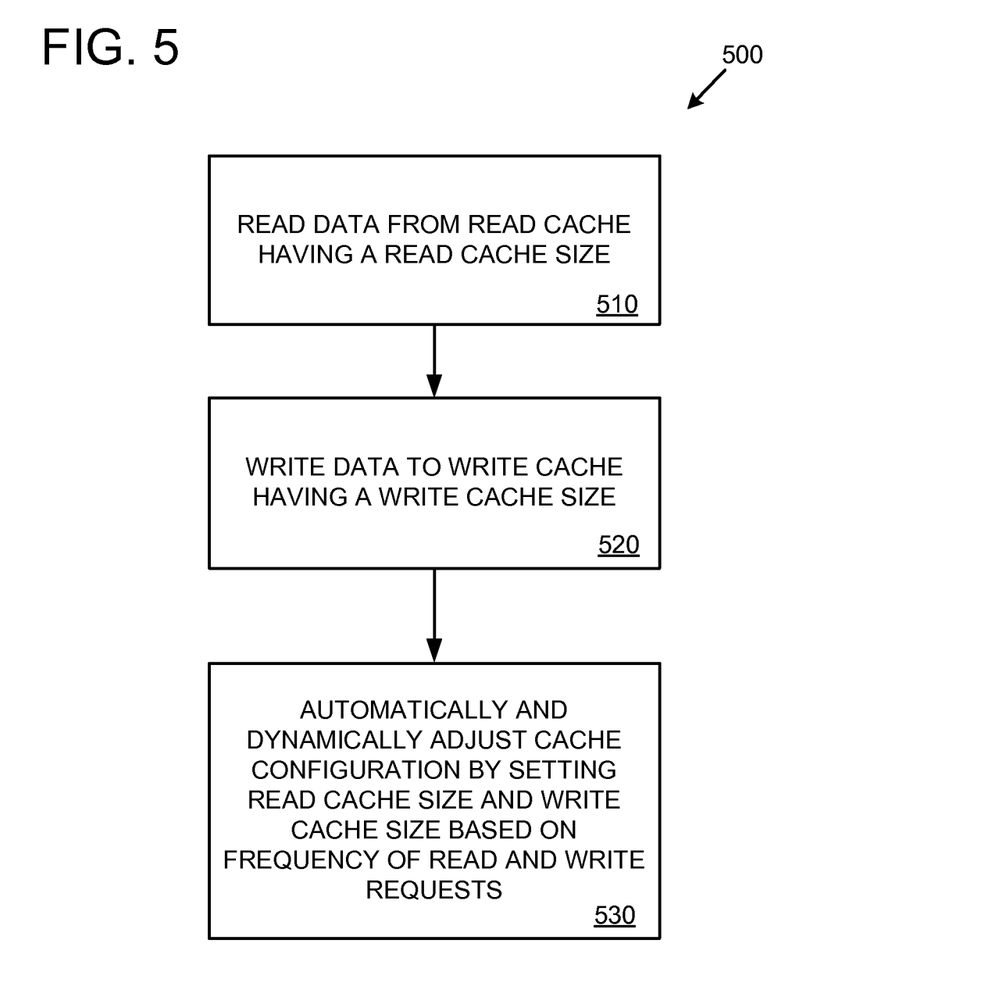
FIG. 5 is a flowchart showing an example method for dynamic cache configuration of separate read and write caches using frequency of read and write requests.

FIG. 5 shows an example method 500 for dynamic cache configuration of separate read and write caches using frequency of read and write requests. The method can be implemented, for example, using the computing device depicted in FIG. 1 or the computing device depicted in FIG. 2.

At 510, data is read from a read cache having a read cache size. The read cache stores data only from read requests from a storage device. At 520, data is written to a write cache having a write cache size. The write cache stores data only from write requests to the storage device. The read cache and write cache are separate caches.

At 530, the cache configuration of the read cache and the write cache is automatically and dynamically adjusted by adjusting the read cache size and the write cache size based, at least in part, upon a frequency of read requests and frequency of write requests. In a specific implementation, the read cache size is automatically and dynamically increased when the frequency of read operations from a storage device compared with the frequency of write operations from the storage device is greater than a threshold value. If the read cache size is increased, the write cache size can be decreased accordingly, or the read and write cache sizes can be increased/decreased independently.

Figure 6:
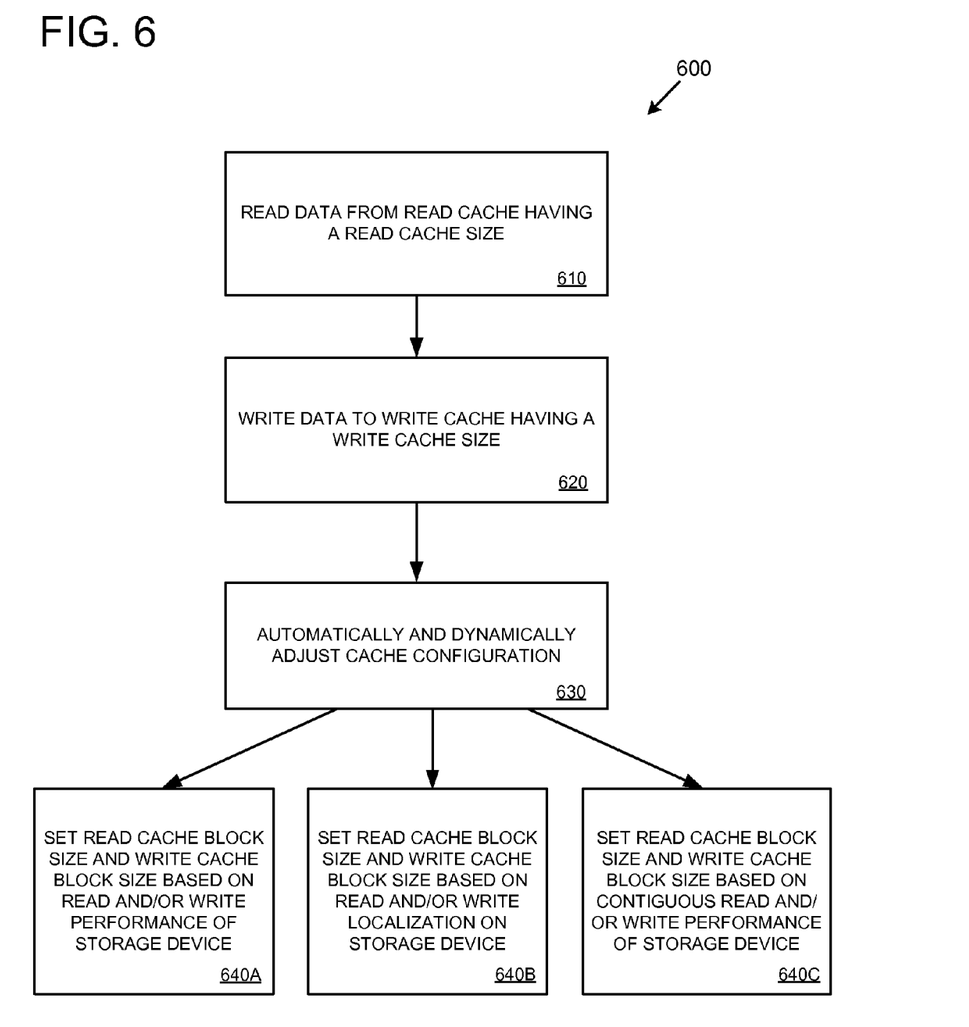
FIG. 6 is a flowchart showing an example method for dynamic cache configuration of separate read and write caches by adjusting read and write cache block size.

FIG. 6 shows an example method 600 for dynamic cache configuration of separate read and write caches by adjusting read and write cache block size. The method can be implemented, for example, using the computing device depicted in FIG. 1 or the computing device depicted in FIG. 2.

At 610, data is read from a read cache having a read cache size. The read cache stores data only from read requests from a storage device. At 620, data is written to a write cache having a write cache size. The write cache stores data only from write requests to the storage device. The read cache and write cache are separate caches.

At 630, the cache configuration is automatically and dynamically adjusted by, at least in part, adjusting the read cache block size and the write cache block size. The read cache block size and write cache block size can be adjusted based on various cache performance parameters. For example, the read cache block size and write cache block size can be adjusted using one or more of the techniques depicted at 640A, 640B, and 640C

At 640A, the read cache block size and/or write cache block size are adjusted based on read and/or write performance of the storage device. For example, write cache block size can be increased if performance history indicates that write operations are taking a long time.

At 640B, the read cache block size and/or write cache block size are adjusted based on read and/or write localization information from the storage device. In a specific implementation, when increased localization is measured, read and/or write cache block size is increased, and when decreased localization is measured, read and/or write cache block size is decreased.

At 640C, the read cache block size and/or write cache block size are adjusted based on contiguous read and/or write performance of the storage device. For example, an upper limit on read and/or write cache block size can be determined.

VII. EXAMPLE MOBILE DEVICES

The techniques and solutions described herein can be performed by software and/or hardware of a computing device, such as a mobile device (a mobile computing device). For example, computing devices include desktop computers, laptop computers, notebook computers, netbooks, tablet devices, media players, and other types of computing devices. Mobile devices include, for example, mobile phones, personal digital assistants (PDAs), smart phones, tablet computers, laptop computers, and other types of mobile computing devices. Mobile devices often have more limited computing resources (e.g., processing unit speed, memory, graphics resources, etc.) than other types of computing devices (e.g., a desktop or laptop computer). Therefore, in some situations, mobile devices benefit more from the techniques and solutions described here. However, depending on implementation details, any type of computing device can benefit from the techniques and solutions described herein.

Figure 7:
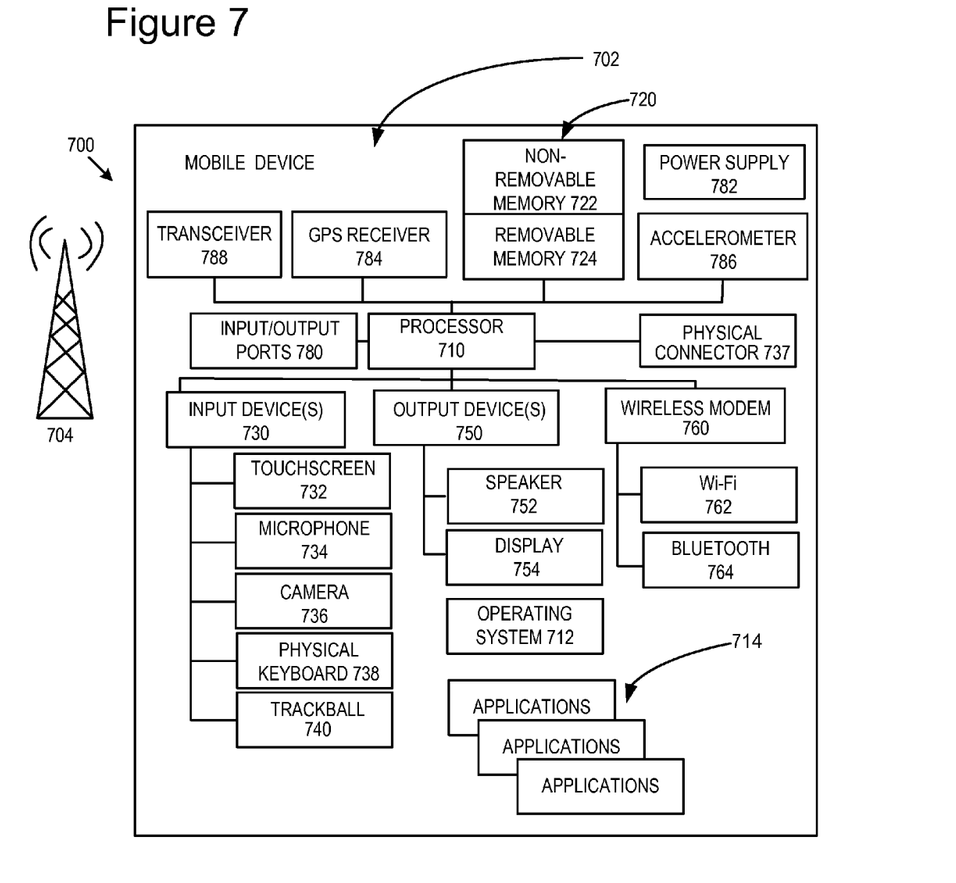
FIG. 7 is a block diagram showing an example mobile device.

FIG. 7 depicts a detailed example of a mobile device 700 capable of implementing the techniques and solutions described herein. The mobile device 700 includes a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, laptop computer, notebook computer, tablet device, netbook, Personal Digital Assistant (PDA), camera, video camera, etc.) and can allow wireless two-way communications with one or more mobile communications networks 704, such as a Wi-Fi, cellular, or satellite network.

The illustrated mobile device 700 can include a processing unit (e.g., controller or processor) 710, such as a signal processor, microprocessor, ASIC, or other control and processing logic circuitry, for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications, video or movie applications, picture or photo applications), or any other computing application.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touch screen 732, microphone 734, camera 736 (e.g., capable of capturing still pictures and/or video images), physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touch screen 732 and display 754 can be combined in a single input/output device.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, a transceiver 788 (for wirelessly transmitting analog or digital signals) and/or a physical connector 737, which can be a USB port, IEEE 1394 (FireWire) port, and/or RS-232 port. The illustrated components 702 are not required or all-inclusive, as any components can be deleted and other components can be added.

The mobile device 700 can implement the technologies described herein. For example, the mobile device 700 can automatically and dynamically adjust cache configuration of separate read and write caches stored in memory 722.

VIII. EXAMPLE ALTERNATIVES AND VARIATIONS

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

We claim:

1. A computing device comprising:
    a read cache having a read cache size, wherein the read cache stores data from read requests from a storage device of the computing device; and
    a write cache having a write cache size, wherein the write cache stores data from write requests to the storage device of the computing device;
    wherein the read cache and the write cache are separate caches, wherein the read cache stores data only from read requests, and wherein the write cache stores data only from write requests; and
    wherein the computing device automatically and dynamically, without user intervention, adjusts cache configuration of the read cache and the write cache based at least in part upon cache performance parameters measured by the computing device.

2. The computing device of claim 1 wherein the computing device comprises an application programming interface (API), wherein the API is configured for:

receiving (from a file system) a preference score for one or more data blocks read, or written, by the computing device, wherein the preference score is used, at least in part, by the computing device in determining whether to cache the one or more data blocks.

3. The computing device of claim 2 wherein when the computing device determines to cache the one or more data blocks, the preference score is further used, at least in part, by the computing device in determining when to evict the one or more data blocks from the read cache or the write cache.

4. The computing device of claim 1 wherein the computing device automatically and dynamically adjusts cache configuration by setting the read cache size and the write cache size based at least in part upon cache performance parameters comprising a frequency of read requests and a frequency of write requests.

5. The computing device of claim 4 wherein the computing device automatically and dynamically increases the read cache size when the frequency of read requests compared to the frequency of write requests is greater than a threshold.

6. The computing device of claim 1 wherein cache blocks in the read cache have a read cache block size, wherein cache blocks in the write cache have a write cache block size, and wherein the computing device sets the read cache block size and the write cache block size independently of each other.

7. The computing device of claim 6 wherein the computing device automatically and dynamically adjusts the read cache block size and the write cache block size based, at least in part, on cache performance parameters comprising:
- read performance of the storage device; and
- write performance of the storage device.

8. The computing device of claim 6 wherein the computing device automatically and dynamically adjusts the read cache block size and the write cache block size based, at least in part, on whether reads and writes are localized on the storage device, wherein:
- read cache block size is increased when read localization increases;
- read cache block size is decreased when read localization decreases;
- write cache block size is increased when write localization increases; and
- write cache block size is decreased when write localization decreases.

9. The computing device of claim 6 wherein the computing device measures cache performance parameters comprising:
- contiguous read performance of the storage device; and
- contiguous write performance of the storage device;
- wherein the computing device automatically and dynamically adjusts the read cache block size and the write cache block size based, at least in part, on the measured cache performance parameters.

10. The computing device of claim 9 wherein the computing device sets an upper limit on the read cache block size and/or the write cache block size based, at least in part, on the measured cache performance parameters.

11. The computing device of claim 1 wherein the read cache and the write cache are separate physical caches.

12. A method, implemented at least in part by a computing device comprising a storage device, for reading and writing data to the storage device, the method comprising:
- reading, by the computing device, data from a read cache having a read cache size, wherein the read cache stores data from read requests from the storage device of the computing device;
- writing, by the computing device, data to a write cache having a write cache size, wherein the write cache stores data from write requests to the storage device of the computing device, wherein the read cache and the write cache are separate caches, wherein the read cache stores data only from read requests, and wherein the write cache stores data only from write requests; and
- automatically and dynamically, without user intervention, adjusting, by the computing device, cache configuration of the read cache and the write cache based at least in part upon cache performance parameters measured by the computing device.

13. The method of claim 12 wherein the computing device comprises an application programming interface (API), the method further comprising:
- receiving, via the API from a file system associated with the storage device, a preference score for one or more data blocks read, or written, by the computing device, wherein the preference score is used, at least in part, by the computing device in determining:
  - whether to cache the one or more data blocks; and
  - when to evict the one or more data blocks from the read cache or the write cache when the one or more data blocks are stored in the read cache or the write cache.

14. The method of claim 12 wherein the automatically and dynamically adjusting cache configuration comprises:
- setting, by the computing device, the read cache size and the write cache size based at least in part upon cache performance parameters comprising a frequency of read requests and a frequency of write requests.

15. The method of claim 14 wherein the read cache size is automatically and dynamically increased when the frequency of read requests compared to the frequency of write requests is greater than a threshold.

16. The method of claim 12 wherein cache blocks in the read cache have a read cache block size, wherein cache blocks in the write cache have a write cache block size, wherein the computing device sets the read cache block size and the write cache block size independently of each other, and wherein the automatically and dynamically adjusting cache configuration comprises:
- adjusting, by the computing device, the read cache block size and the write cache block size based, at least in part, on cache performance parameters comprising:
  - read performance of the storage device; and
  - write performance of the storage device.

17. The method of claim 12 wherein cache blocks in the read cache have a read cache block size, wherein cache blocks in the write cache have a write cache block size, wherein the computing device sets the read cache block size and the write cache block size independently of each other, and wherein the automatically and dynamically adjusting cache configuration comprises:
- adjusting, by the computing device, the read cache block size and the write cache block size based, at least in part, on whether reads and writes are localized on the storage device, wherein:
  - read cache block size is increased when read localization increases;
  - read cache block size is decreased when read localization decreases;
  - write cache block size is increased when write localization increases; and
  - write cache block size is decreased when write localization decreases.

18. The method of claim 12 wherein cache blocks in the read cache have a read cache block size, wherein cache blocks in the write cache have a write cache block size, wherein the computing device sets the read cache block size and the write cache block size independently of each other, and wherein the automatically and dynamically adjusting cache configuration comprises:
  measuring, by the computing device, cache performance parameters comprising:
    contiguous read performance of the storage device; and
    contiguous write performance of the storage device; and
  adjusting, by the computing device, the read cache block size and the write cache block size based, at least in part, on the measured cache performance parameters.

19. The method of claim 18 further comprising:
  setting, by the computing device, an upper limit on the read cache block size and/or the write cache block size based on the measured cache performance parameters.

20. A computing device comprising:
  a read cache having a read cache size, wherein the read cache stores data from read requests from a storage device of the computing device;
  a write cache having a write cache size, wherein the write cache stores data from write requests to the storage device of the computing device;
  wherein the read cache and the write cache are separate caches, wherein the read cache stores data only from read requests, and wherein the write cache stores data only from write requests;
  wherein the computing device automatically and dynamically, without user intervention, adjusts cache configuration of the read cache and the write cache based at least in part upon cache performance parameters measured by the computing device, wherein cache blocks in the read cache have a read cache block size, wherein cache blocks in the write cache have a write cache block size, and wherein the computing device sets the read cache block size and the write cache block size independently of each other, and wherein the computing device automatically and dynamically adjusts the read cache block size and the write cache block size based, at least in part, on cache performance parameters comprising:
    read performance of the storage device; and
    write performance of the storage device; and
  wherein the computing device comprises an application programming interface (API), wherein the API is configured for receiving (from a file system) a preference score for one or more data blocks read, or written, by the computing device, wherein the preference score is used, at least in part, by the computing device in determining:
    whether to cache the one or more data blocks; and
    when to evict the one or more data blocks from the read cache or the write cache when the computing device determines to cache the one or more data blocks.

\* \* \* \* \*